United States Patent [19]
Jahnke

[11] Patent Number: 5,299,974
[45] Date of Patent: Apr. 5, 1994

[54] METHOD AND APPARATUS FOR PRODUCING A WHOLE FISH PRODUCT

[75] Inventor: Joachim Jahnke, Lübeck, Fed. Rep. of Germany

[73] Assignee: Nordischer Maschinenbau Rud. Baader GmbH & Co KG, Lubeck, Fed. Rep. of Germany

[21] Appl. No.: 943,560

[22] Filed: Sep. 11, 1992

[30] Foreign Application Priority Data

Sep. 12, 1991 [DE] Fed. Rep. of Germany ....... 4130291

[51] Int. Cl.⁵ .............................................. A22C 25/16
[52] U.S. Cl. .................................... 452/106; 452/120; 452/162
[58] Field of Search ............... 452/161, 162, 149, 170, 452/106, 120

[56] References Cited

U.S. PATENT DOCUMENTS

| | | | |
|---|---|---|---|
| 3,187,376 | 6/1965 | Laws | 452/106 |
| 4,056,866 | 11/1977 | Wenzel | 452/162 |
| 5,106,335 | 4/1992 | Behnk | 452/162 |

FOREIGN PATENT DOCUMENTS

| | | |
|---|---|---|
| 509733 | 10/1930 | Fed. Rep. of Germany . |
| 2606178 | 11/1976 | Fed. Rep. of Germany ...... 452/162 |
| 2832329 | 3/1979 | Fed. Rep. of Germany ...... 452/162 |
| 2912982 | 10/1980 | Fed. Rep. of Germany ...... 456/161 |
| 65966 | 3/1956 | France . |
| 334813 | 9/1930 | United Kingdom . |

Primary Examiner—Willis Little
Attorney, Agent, or Firm—Fay, Sharpe, Beall, Fagan, Minnich & McKee

[57] ABSTRACT

In a mechanical process for producing a fish product which may be described as a double fillet including head and tail, the intestines and the bone structure are removed completely and the gills at least partially. The processing is performed from the tail end and comprises the steps of making incisions on both sides of the belly spokes along the whole length of the fish from the ventral side while simultaneously removing the intestines and the gills, while subsequently the bone structure is cut out from the fish body by cutting over the ribs. The obtained double fillet can be folded together by folding down the double fillet halves to form an apparently complete fish.

30 Claims, 2 Drawing Sheets

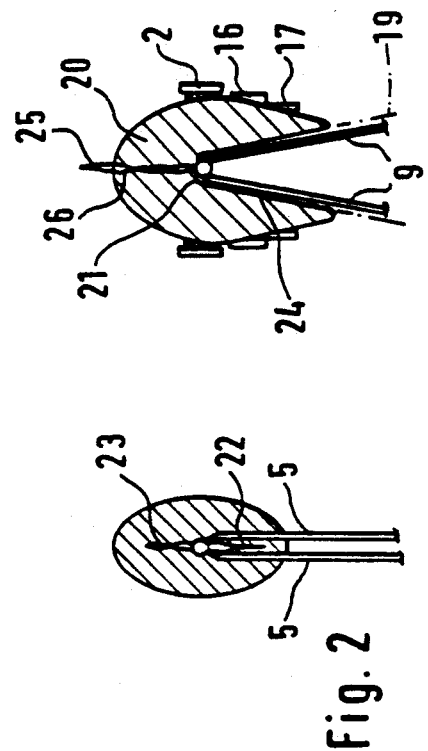
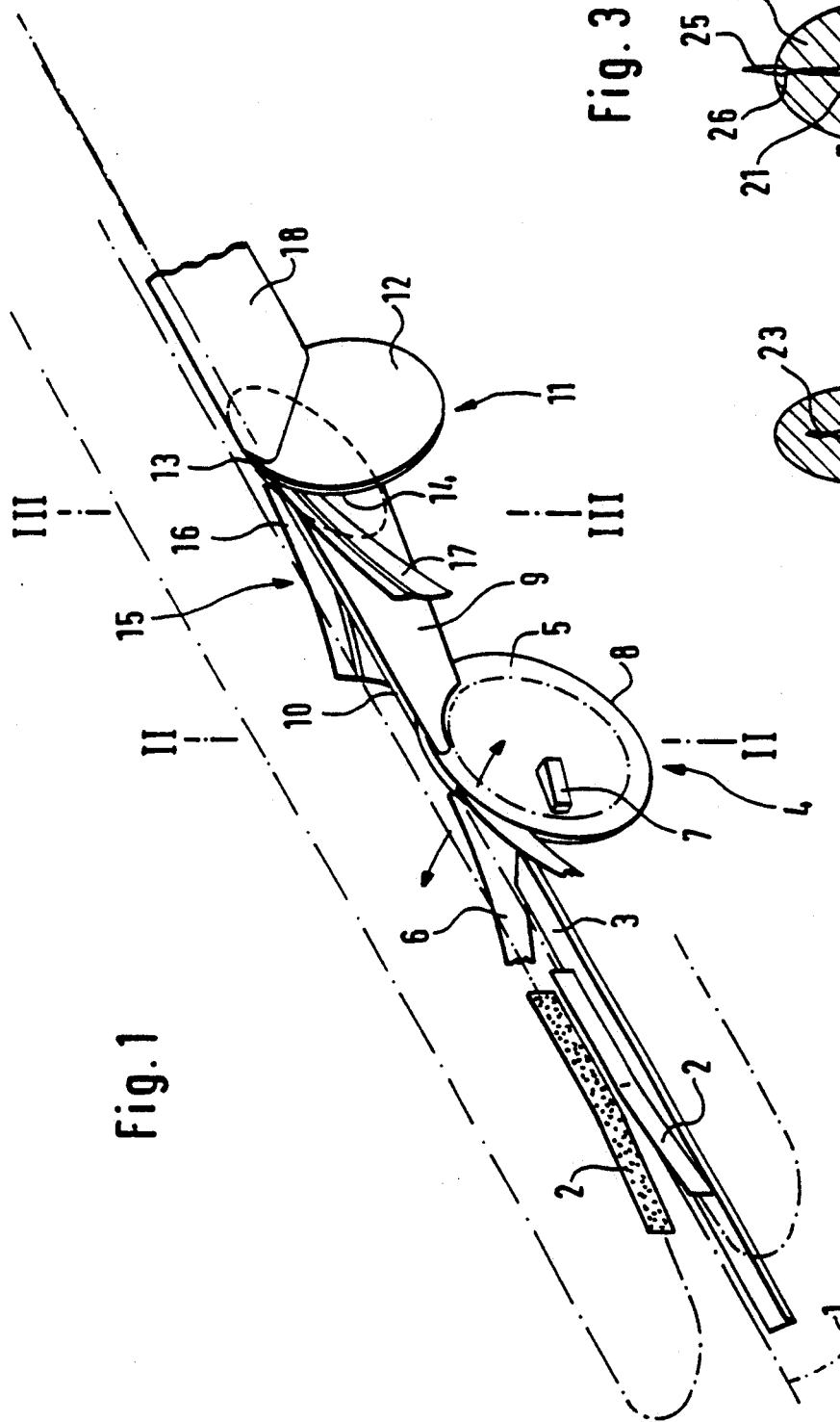

METHOD AND APPARATUS FOR PRODUCING A WHOLE FISH PRODUCT

BACKGROUND OF THE INVENTION

1. Field of the Invention

The present invention refers to a method and an apparatus for producing a fish product including head, body and tail from a non-decapitated fish defining a plane of symmetry and having intestines, gills, back fins with fin holders and skeleton essentially including a vertebral column, ribs, back spokes and belly spokes, which method and apparatus comprise a sequence of processing steps or tools and guides, respectively, for removing essentially completely the skeleton and at least the largest portion of the gills.

2. Prior Art

A fish product of the aforementioned type is e.g. marketed as "boneless rainbow trout". This product is manufactured manually and represents a boneless fillet including head and tail, which forms a practically ideal starting product for various preparations of meals. The processing required to this end has to be extremely precise and thus involves high expenditure. Furthermore, a relatively high loss in yield in fish meat occurs, on an average, during the processing. This, of course, is disadvantageous and caused by the fact that the cuts for cutting out of the skeleton have to be performed rather "boldly" in order to guarantee that the product may be termed "boneless".

On the other hand, German Patent 509 733 describes a deboning method performed by machining with regard to decapitated fish, i.e. fish rumps which, during such processing, are conveyed with their tail end leading. In this known method the vertebral column is removed from the fish rump together with the ribs, whereas the back spokes are cut through and thus remain in the fish rump.

SUMMARY OF THE INVENTION

It is thus the main object of the present invention to suggest a method and an apparatus for improving the production of a fish product simulating a whole fish.

It is a further important object of the present invention to suggest a method and an apparatus by which such production can be performed in a manner saving human labour and at high yield.

A further important object the invention suggests a method and an apparatus with the aid of which loss in valuable fish meat can be reduced considerably.

In a method for producing a fish product including head, body and tail from a non-decapitated fish defining a plane of symmetry and having intestines, gills, back fins with fin holders, and a skeleton essentially including a vertebral column, ribs, back spokes and belly spokes, these objects are achieved, according to the present invention, by a sequence of processing steps which are carried out by machining in a direction starting from the tail towards the head and comprise performing first incisions from the ventral side and extending over the whole length of the fish at both sides of the plane of symmetry at least up to the vertebral column; removing the intestines and the at least largest portion of the gills; and cutting out the skeleton by second incisions starting from the ventral side over the whole length of the fish at both sides of the plane of symmetry and inclined with regard to the latter to pass over the ribs, extending into the proximity of the back fin holders and meeting there.

According to another aspect of the present invention and to achieve the above objects, there is also suggested an apparatus for producing a fish product of the aforementioned type, which apparatus comprises a sequence of tools and guides mechanically driven and/or controlled, which are arranged along a processing path, as well as fish conveying means for conveying the fish with the tail leading along the processing path, the sequence of tools and guides including at least a set of first guides including outwardly deflectable guide elements for supporting the fish transverse to the guide path and for centering it with its ventral side downwards; a set of first knives for performing first incisions from the ventral side and extending over the whole length of the fish, the first incisions being located at both sides of the plane of symmetry essentially parallel thereto and extending up to at least the vertebral column; clean-out tools for removing the intestines and the gills; second guides for guiding the belly spokes cut free by the first knives; second knives for cutting out the skeleton by second incisions, the second knives being adapted to perform incisions starting from the ventral side over the whole length of the fish at both sides of the plane of symmetry and inclined with regard to the latter to pass over the ribs, extending into the proximity of the back fin holders and meeting there; and third guides for partially covering the second knives.

By such method and apparatus it is possible to obtain a deboned fish product in the form of two adhering fillets with the head still present, which may be folded together to present the appearance of a whole fish but from which the skeleton has been removed essentially completely, while also the at least largest portion of the gills has been removed.

Preferably, the removing of the intestines and the gills can be performed simultaneously with the carrying out of the first incisions. To this end, it is advantageous to design the apparatus such that the clean-out tool and the first knives form a combined tool which presents an operative unit.

Expediently, the first knives may be designed as rotating circular knives defining peripheral cutting edges and outer flanks on which the clean-out tools are arranged in the form of raised clean-out elements such that they are offset from the peripheral edges in a radial direction. This not only allows for the aforementioned simultaneous processing step but also helps to reduce the number of required working stations and tools in the apparatus, thus keeping costs down.

According to another advantageous embodiment of the invention, the second guides being effective inside the fish may be associated with outer guides designed as outwardly and resiliently deflectable lamellae engaging the outer surface of the fish, which helps to centre the fish accurately.

According to yet another preferred embodiment of the invention, the second guides and the second knives may be arranged in a roof-shaped manner relative to the plane of symmetry of the fish, the second guides defining upper guiding edges extending essentially tangentially from the highest point of the first guides and parallel to the processing path, and also forming a first gap therebetween, and a second gap for the passage of the ribs being provided in a direction transversal to the processing path between the outer faces of the second guides and inner faces of the second knives designed as rotating circular knives.

A still further advantageous embodiment provides for an apparatus in which the third guides are formed as a V-shaped unitary supporting element defining a ridge line extending tangentially from the ridge point of the second knives in a conveying direction of the conveying means, roof-shaped supporting faces of the supporting element covering outer flanks of the second knives.

By such arrangement highly precise cuts can be performed reducing the loss and safeguarding an accurate product.

The overall advantages obtained by using the method and/or the apparatus according to the present invention and the preferred embodiments thereof in particular reside in that fillet meat can be gained at high yield and certainly being free of bones. This may be achieved at comparatively low expenditure in structure, maintenance and human labour. The result obtained by such processing is a product which is familiar to the consumer and which almost completely disguises the fact that it is has been produced by machining.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 shows a diagrammatic top view of a processing apparatus according to the present invention in axonometric representation;

FIG. 2 shows a cross-section through the apparatus shown in FIG. 1 according to section line II—II;

FIG. 3 shows a cross-section through the apparatus of FIG. 1 according to section line III—III;

DETAILED DESCRIPTION OF THE PREFERRED EMBODIMENTS

Figure 4:
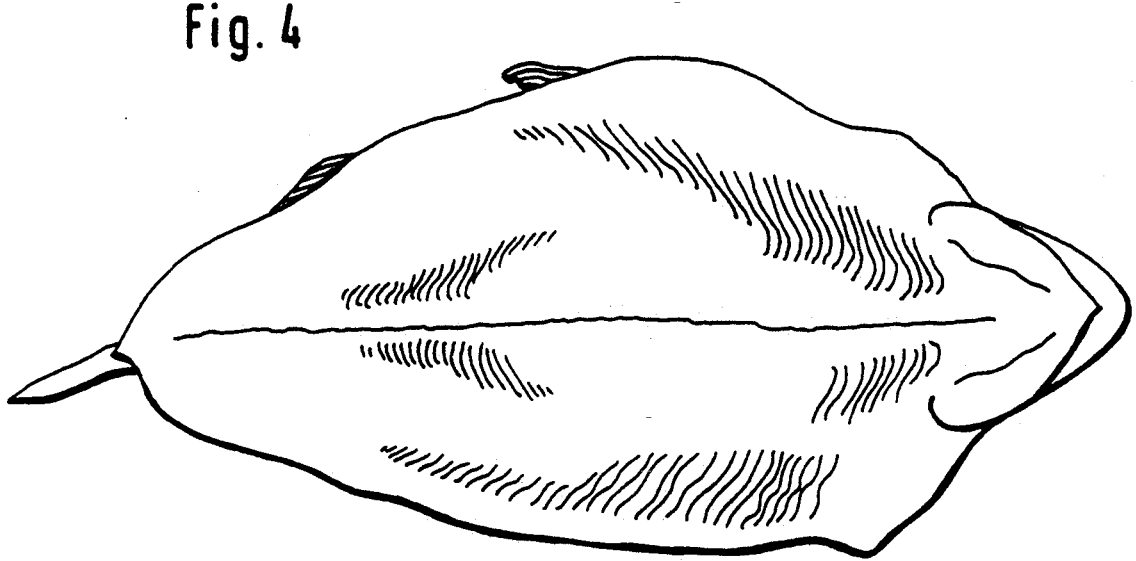
FIG. 4 shows a bottom view of the head including double fillet produced.

An apparatus for performing the method and constructed according to the present invention is mounted in a non-shown machine frame and defines a processing path 1. The apparatus comprises conveying means 2 arranged along the path and including a pair of driven drag entraining belts 2 which oppose each other at both sides of the processing path and are mounted in a synchronously and laterally deflectable manner. At the start of the processing path 1 there is arranged a feeding chute 3 for receiving fish in their natural swimming position but with their tail end leading. The feeding chute 3 is followed by a first processing tool 4. This processing tool includes a pair of driven circular knives 5 spaced with regard to each other for making incisions in a fish 20 (see FIG. 2) at both sides of belly spokes 22 in an upward direction up to the vertebral column 21.

For centering the fish precisely with regard to its plane of symmetry indicated by the vertical dash-dotted lines in FIGS. 2 and 3, there are arranged, apart from the drag entraining belts 2, appropriately shaped guiding elements 6 which are deflectable synchronously in an outward direction against the force of springs and support the fish laterally. The circular knives 5 define outer knife flanks which are equipped with excavating means in the shape of clean-out elements 7 for removing the intestines, the arrangement of these elements being such that they are offset radially with regard to peripheral edges 8 of the circular knives 5. In other words, the radius of rotation of the clean-out elements 7 is smaller than the radius of the circular knives 5 outside of the radius of rotation of the clean-out elements 7 the circular knives 5 are partly covered by belly guides 9, which define a gap 10 between them for guiding the cut-free belly spokes of the fish, and which have guiding edges extending tangentially from the highest point of the peripheral cutting edges 8 of the circular knives 5. The belly guides 9 are followed by the second and last processing tool 11. This comprises a pair of driven circular knives 12 which are arranged in a roof-shaped manner with regard to each other forming an angle of approximately 30°, and which have their closest approximation at a ridge point 13. This ridge point 13 is arranged at a predetermined distance above the guiding edges of the belly guides 9. The belly guides continue up to a position closely adjacent the circular knives 12 and, in the operative region of the latter, are arranged in a roof-shaped manner in the sense described before, their association with the circular knives being such that between the inner flanks of the circular knives and the outer flanks of the belly guides 9 a gap 19 is formed allowing the passage of ribs 24 of fish 20. Immediately upstream of the circular knives 12 outer guides 15 are arranged engaging on the flanks of the fish and comprising individual, outwardly and resiliently deflectable lamella 16 and 17. The final portion of the apparatus is formed by a supporting element 18 which is designed in a roof-shaped manner according to the angle of the circular knives 12 and designed such that it defines a ridge line extending tangentially from a ridge point 13 of the circular knives 12, the roof-shaped supporting surfaces of the supporting element 18 covering the outer flanks of the circular knives 12 and being parallel to the processing path 1 in the rearward region of the knives 12.

The mode of operation of the aforementioned apparatus is as follows:

A fish 20 to be processed is fed manually or by any appropriate feeding device into the feeding chute 3 with the belly in a downward direction and the tail leading. During this feeding operation the fish is seized by the drag entrainer belts 2 of the conveying means engaging it by its flanks essentially above the side-line of the fish, and it is conveyed towards the first processing tool 4. Following the guidance by the guiding elements 6 the fish arrives at this processing tool 4 in a precisely aligned manner with regard to its plane of symmetry so that its tail fin enters between the circular knives 5 and these start to cut at both sides of the belly spokes 22. The depth of cutting is set such that the incisions end closely adjacent to the flanks of the vertebral column 21, the ribs 24 normally not being separated during the passage through the belly cavity. During the cutting process in the area of the belly cavity the intestines and gills are seized by the clean-out elements arranged on the flanks of the circular knives 5. The fish, now having been provided with incisions along its whole length including the head from the ventral side, is subsequently conveyed towards the second processing tool 11 while riding on the guiding edges of the belly guides 9 with the vertebral column 21 freed, the belly spokes 22 being slidingly guided in the gap 10 between the belly guides 9. Shortly before reaching this second processing tool 11 the fish runs under the resilient lamella 16/17 which have the effect that the fish is pressed against the flanks of the belly guides 9 inclined in a roof-shaped manner, while the ribs 24 are straightened with the pressure acting against the inner surfaces of the belly cavity (FIG. 3). In this manner, the circular knives 12 are guided in cutting planes 19 indicated by dash-dotted lines in FIG. 3. Thus, from the inner surfaces, there is cut off one slice each having the thickness of the gap 14, which slices contain the ribs 24. Simultaneously, the vertebral column 21 is cut out together with the back spokes 23. It will be noted that this cutting out of the back spokes 23 occurs up to a position closely adjacent the fin holders 26 of the back fins 25, so that the two fillets adhere to each other in the back region of the fish without any danger occurring of the fillets falling apart in this region.

Figure 5:
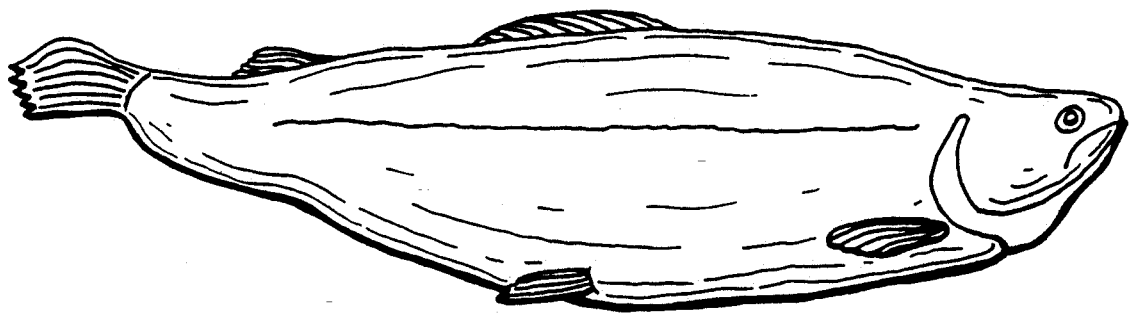
FIG. 5 shows a side view of a gutted and deboned fish produced according to the present invention and folded together from the double fillet shown in FIG. 4.

Consequently, a "butterfly"-shaped product is obtained which is freed from all essential bone portions and from the intestines, but which still comprises the essential portions of the head and the tail. This product shown in FIG. 4 can be folded together again to form a whole-fish product as shown in FIG. 5 simulating a "whole" fish having natural contours.

What is claimed is:

1. A method for producing a fish product including head, body and tail from a non-decapitated fish defining a ventral and a back side as well as a plane of symmetry between both sides, and having intestines, gills, back fins with fin holders and a skeleton essentially including a vertebral column, ribs, back spokes and belly spokes, which method comprises:
   a sequence of processing steps performed by machinery for removing essentially completely said skeleton and at least the largest portion of said gills, wherein said processing steps comprise
   a) performing two first incisions in a direction starting from said tail and proceeding towards said head, each of said first incisions starting from said ventral side and extending over the whole length of said fish at respective sides of said plane of symmetry at least up to said vertebral column;
   b) removing said intestines and said at least largest portion of said gills; and
   c) cutting out said skeleton with two second incisions in a direction starting from said tail towards said head, each of said second incisions starting from the ventral side, extending over the whole length of the fish at respective sides of said plane of symmetry, inclined with regard to the plane of symmetry, passing outwardly of said ribs, and extending into and meeting at the proximity of said back fin holders.

2. A method as claimed in claim 1, wherein said removing of said intestines and said at least largest portion of said gills is performed simultaneously with said performing two first incisions.

3. An apparatus for producing a fish product including head, body and tail from a non-decapitated fish defining a ventral and a back side as well as a plane of symmetry between both sides, and having intestines, gills, back fins with fin holders and a skeleton essentially including a vertebral column, ribs, back spokes and belly spokes, which apparatus is adapted to remove essentially completely said skeleton and at least the largest portion of said gills, wherein said apparatus comprises:
   a sequence of tools and guides mechanically driven, controlled and arranged along a processing path;
   fish conveying means for conveying said fish with said tail leading along said processing path;
   said guides including a set of first guide means including outwardly deflectable guide elements for supporting the fish transverse to said guide path and for centering it with said ventral side downwards;
   said tools including a set of first knife means for performing first incisions from the ventral side and extending over the whole length of said fish, said first incisions being made at both sides of said plane of symmetry centrally parallel thereto up to at least said vertebral column to cut free the belly spokes;
   said tools further including clean-out means for removing said intestines and said gills;
   said guides further including second guide means for guiding said belly spokes cut free by said first knife means;
   said tools further including second knife means for cutting out said skeleton by second incisions starting from the ventral side over the whole length of the fish at both sides of said plane of symmetry and inclined with regard to the plane of symmetry to pass over said ribs, and extending into and meeting at the proximity of said back fin holders; and
   said guides further including third guide means for partially covering said second knife means.

4. An apparatus as claimed in claim 3, wherein said clean-out means and said first knife means are a combined tool forming an operative unit for removing said intestines and gills simultaneously together with the performing of said first incisions.

5. An apparatus as claimed in claim 4, wherein said first knife means are designed as rotating circular knives defining peripheral cutting edges and outer flanks on which said clean-out means are arranged in the from of raised clean-out elements offset from the peripheral cutting edges in a radial direction.

6. An apparatus as claimed in claim 3, wherein said second guide means are effective inside said fish and have outer guides as outwardly and resiliently deflectable lamellae engaging the outer surface of said fish.

7. An apparatus as claimed in claim 4, wherein said second guide means are effective inside said fish and have outer guides as outwardly and resiliently deflectable lamellae engaging the outer surface of said fish.

8. An apparatus as claimed in claim 5, wherein said second guide means are effective inside said fish and have outer guides as outwardly and resiliently deflectable lamellae engaging the outer surface of said fish.

9. An apparatus as claimed in claim 3, wherein:
   said second guide means and said second knife means are arranged in a roof-shaped manner relative to said plane of symmetry and said fish so that said second guide means defines upper guiding edges extending essentially tangentially from the highest point of said first guide means and parallel to said processing path and also forming a first gap therebetween, and so that a second gap for the passage of said ribs is provided in a direction transversal to said processing path between outer faces of said second guide means and inner faces of said second knife means; and said second knife means are rotating circular knives.

10. An apparatus as claimed in claim 4, wherein:

said second guide means and said second knife means are arranged in a roof-shaped manner relative to said plane of symmetry of said fish so that said second guide means defines upper guiding edges extending essentially tangentially from the highest point of said first guide means and parallel to said processing path and also forming a first gap therebetween, and so that a second gap for the passage of said ribs is provided in a direction transversal to said processing path between outer faces of said second guide means and inner faces of said second knife means; and said second knife means are rotating circular knives.

11. An apparatus as claimed in claim 5, wherein:

said second guide means and said second knife means are arranged in a roof-shaped manner relative to said plane of symmetry of said fish so that said second guide means defines upper guiding edges extending essentially tangentially from the highest point of said first guide means and parallel to said processing path and also forming a first gap therebetween, and so that a second gap for the passage of said ribs is provided in a direction transversal to said processing path between outer faces of said second guide means and inner faces of said second knife means; and said second knife means are rotating circular knives.

12. An apparatus as claimed in claim 6, wherein:

said second guide means and said second knife means are arranged in a roof-shaped manner relative to said plane of symmetry of said fish so that said second guide means defines upper guiding edges extending essentially tangentially from the highest point of said first guide means and parallel to said processing path and also forming a first gap therebetween, and so that a second gap for the passage of said ribs is provided in a direction transversal to said processing path between outer faces of said second guide means and inner faces of said second knife means; and said second knife means are rotating circular knives.

13. An apparatus as claimed in claim 7, wherein:

said second guide means and said second knife means are arranged in a roof-shaped manner relative to said plane of symmetry of said fish so that said second guide means defines upper guiding edges extending essentially tangentially from the highest point of said first guide means and parallel to said processing path and also forming a first gap therebetween, and so that a second gap for the passage of said ribs is provided in a direction transversal to said processing path between outer faces of said second guide means and inner faces of said second knife means; and said second knife means are rotating circular knives.

14. An apparatus as claimed in claim 8, wherein:

said second guide means and said second knife means are arranged in a roof-shaped manner relative to said plane of symmetry of said fish so that said second guide means defines upper guiding edges extending essentially tangentially from the highest point of said first guide means and parallel to said processing path and also forming a first gap therebetween, and so that a second gap for the passage of said ribs is provided in a direction transversal to said processing path between outer faces of said second guide means and inner faces of said second knife means; and said second knife means are rotating circular knives.

15. An apparatus as claimed in claim 9, wherein said third guide means are formed as a V-shaped unitary supporting element defining a ridge line extending tangentially from a ridge point of said second knife means in a conveying direction of said conveying means, roof-shaped supporting faces of said supporting element covering outer flanks of said second knife means.

16. An apparatus as claimed in claim 10, wherein said third guide means are formed as a V-shaped unitary supporting element defining a ridge line extending tangentially from a ridge point of said second knife means in a conveying direction of said conveying means, roof-shaped supporting faces of said supporting element covering outer flanks of said second knife means.

17. An apparatus as claimed in claim 11, wherein said third guide means are formed as a V-shaped unitary supporting element defining a ridge line extending tangentially from a ridge point of said second knife means in a conveying direction of said conveying means, roof-shaped supporting faces of said supporting element covering outer flanks of said second knife means.

18. An apparatus as claimed in claim 12, wherein said third guide means are formed as a V-shaped unitary supporting element defining a ridge line extending tangentially from a ridge point of said second knife means in a conveying direction of said conveying means, roof-shaped supporting faces of said supporting element covering outer flanks of said second knife means.

19. An apparatus as claimed in claim 13, wherein said third guide means are formed as a V-shaped unitary supporting element defining a ridge line extending tangentially from a ridge point of said second knife means in a conveying direction of said conveying means, roof-shaped supporting faces of said supporting element covering outer flanks of said second knife means.

20. An apparatus as claimed in claim 14, wherein said third guide means are formed as a V-shaped unitary supporting element defining a ridge line extending tangentially from a ridge point of said second knife means in a conveying direction of said conveying means, roof-shaped supporting faces of said supporting element covering outer flanks of said second knife means.

21. A method as claimed in claim 1, wherein said performing two first incisions includes driving two first circular knives generally parallel and coaxial to each other with a space therebetween receiving the belly spokes for cutting the belly spokes free;

wherein said cutting out includes driving two second circular knives generally in inclined planes intersecting each other with a space therebetween receiving the skeleton for cutting the skeleton free; and including between said steps of performing and cutting out guiding the cut-free belly spokes along guiding edges extending tangentially from a periphery of the two first circular knives to a periphery of the two second circular knives while moving the ribs respectively into two planes intersecting at the proximity of said back fin holders.

22. A method as claimed in claim 21, wherein said moving includes engaging the flanks of the fish and resiliently deflecting the flanks inwardly toward said guiding for straightening the ribs to be parallel to said inclined planes, respectively.

23. A method as claimed in claim 1, wherein said performing two first incisions includes rotatably driving two circular knives; and said removing includes rotating clean-out elements respectively with and to the outside of the circular knives at a distance spaced radially inward from outer peripheral edges of the circular knives.

24. A method as claimed in claim 23, wherein said removing is performed simultaneously with said performing two first incisions.

25. A method as claimed in claim 24, wherein said performing two first incisions includes driving two first circular knives generally parallel and coaxial to each other with a space therebetween receiving the belly spokes for cutting the belly spokes free; wherein said cutting out includes driving two second circular knives generally in inclined planes intersecting each other with a space therebetween receiving the skeleton for cutting the skeleton free;

including between said steps of performing and cutting out guiding the cut-free belly spokes along guiding edges extending tangentially from a periphery of the two first circular knives to a periphery of the two second circular knives while moving the ribs respectively into two planes intersecting at the proximity of said back fin holders; and wherein said guiding means includes holding guides between the periphery of the two first circular knives and the clean-out elements.

26. A method as claimed in claim 25, wherein said moving includes engaging the flanks of the fish and resiliently deflecting the flanks inwardly toward said guiding for straightening the ribs to be parallel to said inclined planes, respectively.

27. A method for producing a fish product including head, body and tail from a non-decapitated fish defining a ventral and a back side as well as a plane of symmetry between both sides, and having intestines, gills, back fins with fin holders and a skeleton essentially including a vertebral column, ribs, back spokes and belly spokes, which method comprises:

a sequence of processing steps performed by machinery for removing essentially completely said skeleton and at least the largest portion of said gills, wherein said processing steps comprise a) performing two first incisions along a direction of the vertebral column starting from one of said tail and said head and proceeding towards the other of said tail and said head, each of said first incisions starting from said ventral side and extending over the whole length of said body at respective sides of said plane of symmetry at least up to said vertebral column to cut free the belly spokes;

b) thereafter guiding the cut-free belly spokes while moving the ribs respectively into two inclined planes intersecting at the proximity of said backfin holders; and c) thereafter cutting out said skeleton with two second incisions in a direction starting from the ventral side, extending over the whole length of the body at respective sides of said plane of symmetry, inclined with regard to the plane of symmetry, passing outwardly of said ribs, and extending into and meeting at the proximity of said back fin holders.

28. A method as claimed in claim 27, wherein said performing two first incisions includes driving two first circular knives generally parallel and coaxial to each other with a space therebetween receiving the belly spokes for cutting the belly spokes free; wherein said cutting out includes driving two second circular knives generally in inclined planes intersecting each other with a space therebetween receiving the skeleton for cutting the skeleton free; and including between said steps of performing and cutting out guiding the cut-free belly spokes along guiding edges extending tangentially from a periphery of the two first circular knives to a periphery of the two second circular knives while moving the ribs respectively into two planes intersecting at the proximity of said back fin holders.

29. A method as claimed in claim 27, wherein said moving includes engaging the flanks of the fish and resiliently deflecting the flanks inwardly toward said guiding for straightening the ribs to be parallel to said inclined planes, respectively.

30. A method as claimed in claim 29, wherein said performing two first incisions includes driving two first circular knives generally parallel and coaxial to each other with a space therebetween receiving the belly spokes for cutting the belly spokes free; wherein said cutting out includes driving two second circular knives generally in inclined planes intersecting each other with a space therebetween receiving the skeleton for cutting the skeleton free; and including between said steps of performing and cutting out guiding the cut-free belly spokes along guiding edges extending tangentially from a periphery of the two first circular knives to a periphery of the two second circular knives while moving the ribs respectively into two planes intersecting at the proximity of said back fin holders.

* * * * *